United States Patent
Piech et al.

(10) Patent No.: US 10,196,240 B2
(45) Date of Patent: Feb. 5, 2019

(54) WIRELESS POWER SUPPLY FOR SELF-PROPELLED ELEVATOR

(71) Applicant: OTIS ELEVATOR COMPANY, Farmington, CT (US)

(72) Inventors: Zbigniew Piech, Cheshire, CT (US); Wojciech Szelag, Poznan (PL); Rafal Wojciechowski, Srem (PL); Cezary Jedryczka, Lniano (PL)

(73) Assignee: OTIS ELEVATOR COMPANY, Farmington, CT (US)

( * ) Notice: Subject to any disclaimer, the term of this patent is extended or adjusted under 35 U.S.C. 154(b) by 505 days.

(21) Appl. No.: 14/892,327

(22) PCT Filed: May 21, 2013

(86) PCT No.: PCT/US2013/041999
§ 371 (c)(1),
(2) Date: Nov. 19, 2015

(87) PCT Pub. No.: WO2014/189492
PCT Pub. Date: Nov. 27, 2014

(65) Prior Publication Data
US 2016/0090275 A1    Mar. 31, 2016

(51) Int. Cl.
*B66B 1/06* (2006.01)
*B66B 11/04* (2006.01)
(Continued)

(52) U.S. Cl.
CPC .......... *B66B 11/0407* (2013.01); *B66B 9/00* (2013.01); *B66B 9/02* (2013.01); *B66B 11/0226* (2013.01); *H02J 5/005* (2013.01); *H02K 41/031* (2013.01)

(58) Field of Classification Search
CPC ......... B66B 11/0407; B66B 9/00; B66B 9/02; B66B 11/0226; H02J 5/005; H02K 41/031
(Continued)

(56) References Cited

U.S. PATENT DOCUMENTS 4,635,560 A * 1/1987 Ballantyne .............. B60L 13/03
  104/290
5,183,980 A * 2/1993 Okuma ............... B66B 11/0407
  187/250
(Continued)

FOREIGN PATENT DOCUMENTS

CN    1024334 C    4/1994
EP    0599331 A1   6/1994
(Continued)

OTHER PUBLICATIONS

Chinese Office Action and Search for application 201380076757.2, dated Sep. 20, 2016, 12 pages.
(Continued)

*Primary Examiner* — Anthony Salata
(74) *Attorney, Agent, or Firm* — Cantor Colburn LLP

(57) ABSTRACT

An elevator system includes an elevator car having an elevator car subsystem; a guide rail to guide the elevator car along a hoistway; primary windings positioned along the hoistway; permanent magnets coupled to the elevator car, the primary windings and permanent magnets defining a linear motor for imparting motion to the elevator car in response to a drive signal; and secondary windings coupled to the elevator car, the secondary windings generating a current to power the elevator car subsystem.

19 Claims, 5 Drawing Sheets

(51) Int. Cl.
*B66B 11/02* (2006.01)
*B66B 9/00* (2006.01)
*H02J 5/00* (2016.01)
*H02K 41/03* (2006.01)
*B66B 9/02* (2006.01)

(58) Field of Classification Search
USPC ....... 187/247, 250, 289, 290, 293, 296, 297, 187/391, 393, 413; 104/290, 292, 295, 104/296; 198/619; 310/12.01, 12.04, 310/12.09, 12.11, 300; 318/135
See application file for complete search history.

(56) References Cited

U.S. PATENT DOCUMENTS

| | | | | |
|---|---|---|---|---|
| 5,235,144 A * | 8/1993 | Matsui | ............... | B66B 9/003 187/250 |
| 5,288,956 A * | 2/1994 | Kadokura | ........... | B66B 11/0407 187/250 |
| 5,668,421 A * | 9/1997 | Gladish | .............. | B60L 13/10 104/23.2 |
| 6,189,657 B1 * | 2/2001 | Jessenberger | ....... | B66B 11/0407 187/289 |
| 6,305,501 B1 | 10/2001 | Kahkipuro et al. | | |
| 6,307,766 B1 * | 10/2001 | Ross | ................ | H02J 5/005 363/144 |
| 6,412,604 B1 | 7/2002 | Schuster | | |
| 6,513,627 B1 * | 2/2003 | Cruise | ................ | B66B 15/08 187/258 |
| 7,432,622 B2 * | 10/2008 | Griepentrog | ............ | H01F 38/18 307/104 |
| 8,219,025 B2 * | 7/2012 | Andronic | .............. | H02J 17/00 455/41.1 |
| 9,150,116 B2 * | 10/2015 | Matscheko | ............ | B60L 7/00 |
| 9,906,112 B2 * | 2/2018 | Dwari | .................... | H02J 3/02 |
| 2003/0000778 A1 * | 1/2003 | Smith | ..................... | B66B 1/30 187/289 |
| 2006/0163008 A1 * | 7/2006 | Godwin | .................. | B66B 9/00 187/288 |
| 2008/0190732 A1 * | 8/2008 | Matscheko | ............ | B60L 13/10 198/321 |
| 2010/0006401 A1 | 1/2010 | Flury et al. | | |
| 2012/0193172 A1 | 8/2012 | Matsheko et al. | | |
| 2016/0046464 A1 * | 2/2016 | Piech | ................... | B66B 9/003 187/249 |
| 2016/0083225 A1 * | 3/2016 | Piech | ................. | B66B 11/0407 187/250 |
| 2016/0083226 A1 * | 3/2016 | Piech | ................. | B66B 11/0407 187/250 |
| 2016/0137459 A1 * | 5/2016 | Rodriguez | .......... | H02K 41/031 187/250 |
| 2017/0057780 A1 * | 3/2017 | Nguyen | ................. | H04W 4/70 |
| 2017/0057789 A1 * | 3/2017 | Witczak | .............. | B66B 11/0273 |
| 2017/0057791 A1 * | 3/2017 | Hsu | .......................... | B66B 7/00 |
| 2017/0057792 A1 * | 3/2017 | Dwari | ................. | B66B 11/0407 |
| 2017/0057793 A1 * | 3/2017 | Dwari | ................. | B66B 11/0407 |

FOREIGN PATENT DOCUMENTS

| | | |
|---|---|---|
| JP | 3142369 B2 | 3/2001 |
| JP | 3181656 B2 | 7/2001 |
| JP | 2002003096 A | 1/2002 |

OTHER PUBLICATIONS

International Search Report for application PCT/US2013/041999, dated Feb. 12, 2014, 5 pages.

Written Opinion for application PCT/US2013/041999, dated Feb. 12, 2014, 7 pages.

European Search Report for application EP 13885012.8, dated Apr. 19, 2017, 9pgs.

* cited by examiner

WIRELESS POWER SUPPLY FOR SELF-PROPELLED ELEVATOR

FIELD OF INVENTION

The subject matter disclosed herein relates generally to the field of elevators, and more particularly, to a wireless power supply for a self-propelled elevator.

BACKGROUND

Self-propelled elevator systems, also referred to as ropeless elevator systems, are useful in certain applications (e.g., high rise buildings) where the mass of the ropes for a roped system is prohibitive and/or there is a need for multiple elevator cars in a single hoistway. Elevator cars typically need power for ventilation, lighting systems, control units, communication units and to recharge batteries installed, for example, on an elevator car controller. Existing systems use moving cables or current collectors/sliders to connect a moving elevator car with power lines distributed along the elevator hoistway.

SUMMARY

According to an exemplary embodiment of the invention, an elevator system includes an elevator car having an elevator car subsystem; a guide rail to guide the elevator car along a hoistway; primary windings positioned along the hoistway; permanent magnets coupled to the elevator car, the primary windings and permanent magnets defining a linear motor for imparting motion to the elevator car in response to a drive signal; and secondary windings coupled to the elevator car, the secondary windings generating a current to power the elevator car subsystem.

According to another exemplary embodiment of the invention, a wireless power supply for an elevator car includes primary windings; permanent magnets for coupling to an elevator car, the primary windings and permanent magnets defining a linear motor for imparting motion to the elevator car in response to a drive signal; and secondary windings for coupling to the elevator car, the secondary windings generating a current to power an elevator car subsystem.

According to another exemplary embodiment of the invention, a linear motor system includes a plurality of permanent magnets, configured to be attached to a movable component; a plurality of primary windings configured to impart motion to the permanent magnets; and a plurality of secondary windings configured to be coupled to the movable component, wherein the plurality of secondary windings are configured to passively generate an electrical current when the movable component moves in relation to the plurality of primary windings.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
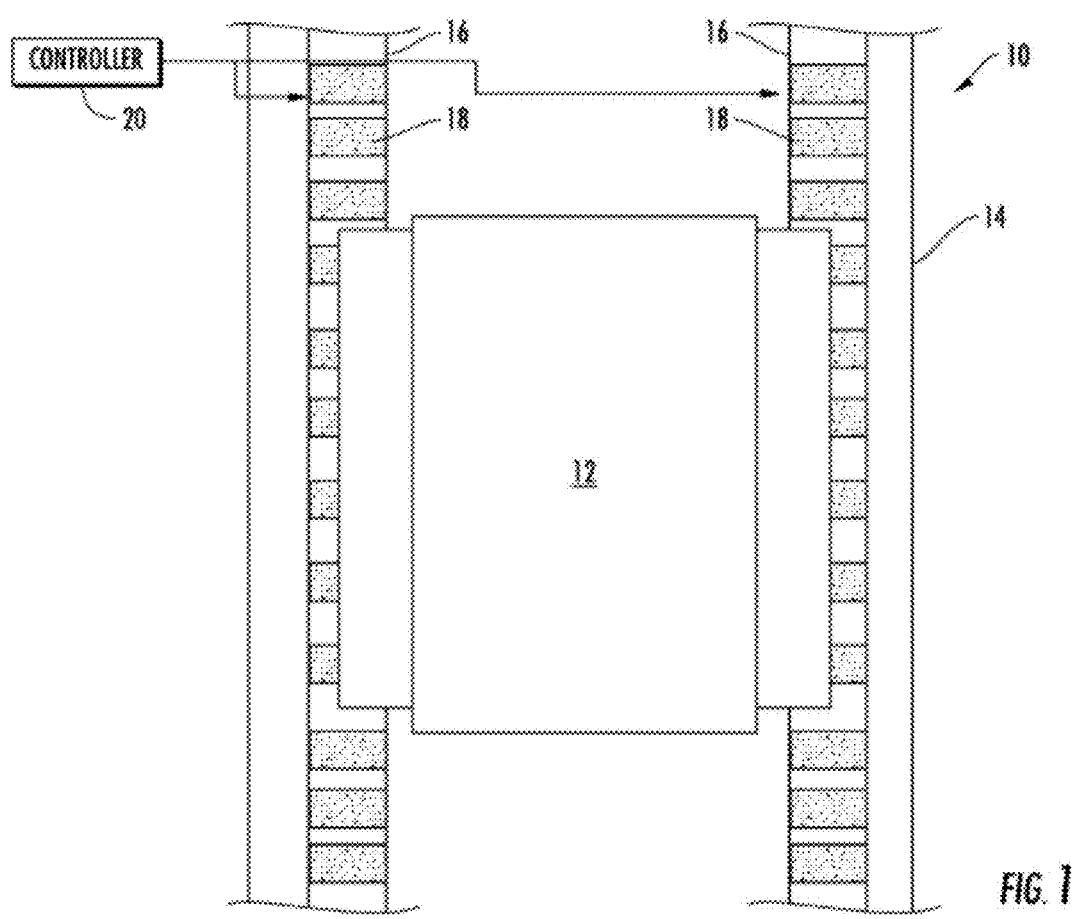
FIG. 1 depicts an elevator system having a wireless power supply in an exemplary embodiment.

FIG. 1 depicts an elevator system 10 having a wireless power supply in an exemplary embodiment. Elevator system 10 includes an elevator car 12 that travels in a hoistway 14. Elevator car 12 travels along one or more guide rails 16 extending along the length of hoistway 14. Elevator system 10 employs a linear motor having primary windings 18 provided along guide rails 16. Primary windings 18 include a plurality of coils coupled to the guide rails 16. Each guide rail 16 on either side of elevator car 12 may include primary windings 18. The primary windings 18 serve as stator windings of a permanent magnet synchronous motor to impart motion to elevator car 12. Primary windings 18 may be arranged in three phases. Primary windings 18 may be located separate from guide rails 16 in exemplary embodiments. According to further exemplary embodiments, windings 18 may be used as guide rails 16 or incorporated into the guide rails 16. According to an exemplary embodiment a single stator may be used instead of multiple stators. Further, multiple stators may be configured on opposite sides of an elevator car 12 as shown in FIG. 1, or they may have different configurations, for example, multiple stators may be positioned adjacent a single side of the elevator car 12.

Controller 20 provides drive signals to the primary windings 18 to impart motion to the elevator car 12. Controller 20 may be implemented using a general-purpose microprocessor executing a computer program stored on a storage medium to perform the operations described herein. Alternatively, controller 20 may be implemented in hardware (e.g., ASIC, FPGA) or in a combination of hardware/software. Controller 20 may also be part of an elevator control system. Controller 20 may include power circuitry (e.g., an inverter or drive) to power the primary windings 18.

Figure 2:
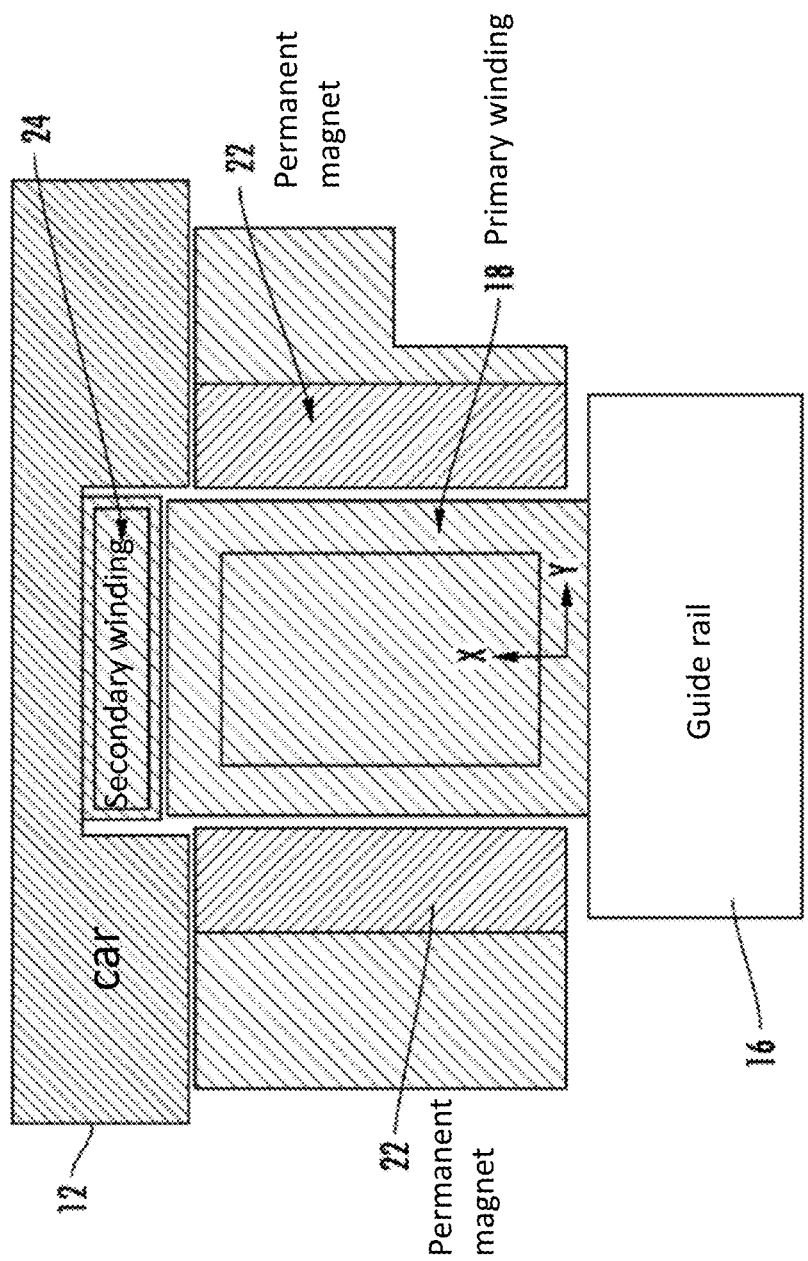
FIG. 2 is a top view of a linear motor and wireless power supply in an exemplary embodiment.

FIG. 2 is top view showing the linear motor and wireless power supply in an exemplary embodiment. A single guide rail 16 is shown, but it is understood that both guide rails 16 and both sides of elevator car 12 may be configured as shown. As shown in FIG. 2, guide rail 16 supports primary windings 18. Coils of the primary windings 18 may be formed about ferromagnetic cores. Permanent magnets 22 are mounted to elevator car 12, and are positioned on opposite sides of the primary windings 18. The primary windings 18 and permanent magnets 22 form a permanent magnet synchronous motor to impart motion to elevator car 12.

Elevator car 12 also includes secondary windings 24 mounted to a cabin of elevator car 12, juxtaposed the primary windings 18. Secondary windings 24 include a plurality of coils coupled to the elevator car 12. Coils of the secondary windings 24 may be formed about ferromagnetic cores. Secondary windings 24 are not used for propulsion of elevator car 12, but rather as a secondary winding of an air core transformer formed by primary windings 18 and secondary windings 24. Drive signals applied to primary windings 18 produce leakage flux that induces an electromotive force in secondary windings 24 to generate a current in the secondary windings 24, as described in further detail herein.

Figure 3:
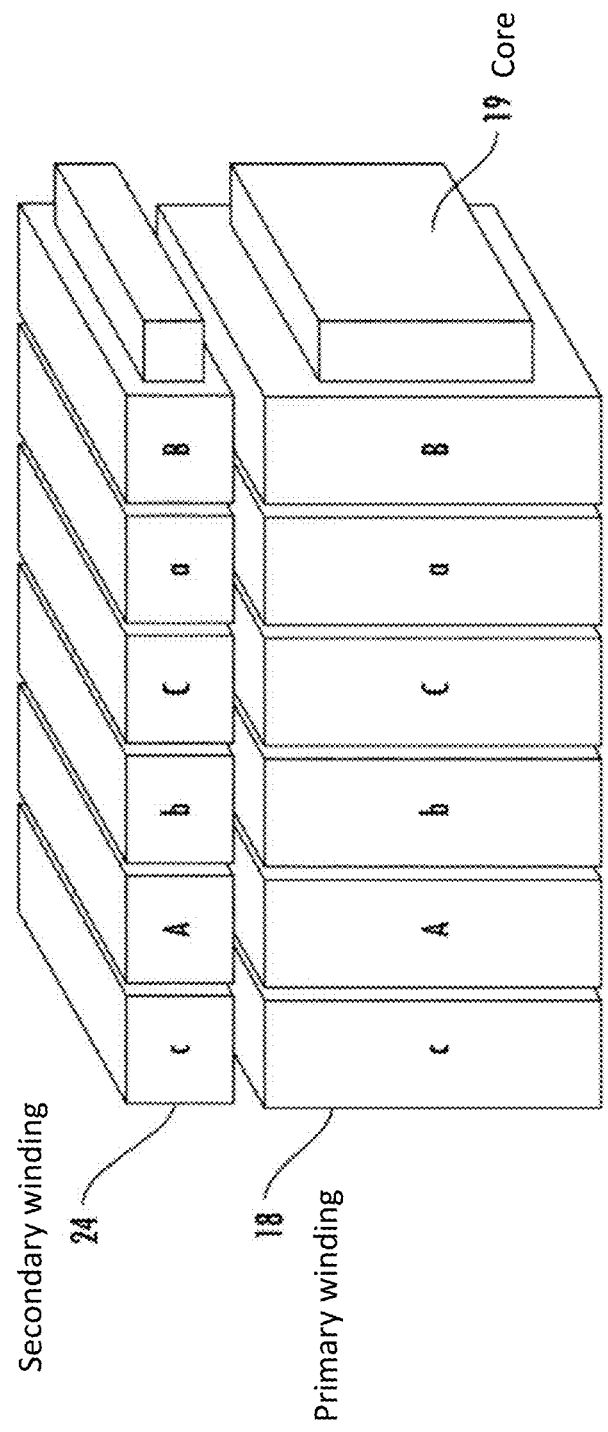
FIG. 3 is a perspective view depicting a winding distribution for the primary windings and secondary windings in an exemplary embodiment.

FIG. 3 is a perspective view depicting a winding distribution for the primary windings 18 and secondary windings 24 in an exemplary embodiment. Primary windings 18 and secondary windings 24 each include a number of coils. In the embodiments of FIG. 2 and FIG. 3, the primary windings 18 are formed about a generally rectangular core or pipe 19. Both the primary windings 18 and secondary windings 24 include three phases, illustrated as A, B and C. The coils of the primary windings 18 and secondary windings 24 are arranged in a repeating pattern. As shown in FIG. 3, the coils of primary windings 18 and secondary windings 24 follow a phase pattern of negative C phase, c, positive A phase, A, negative B phase, b, positive C phase, C, negative A phase, a, and positive B phase, B.

Figure 4:
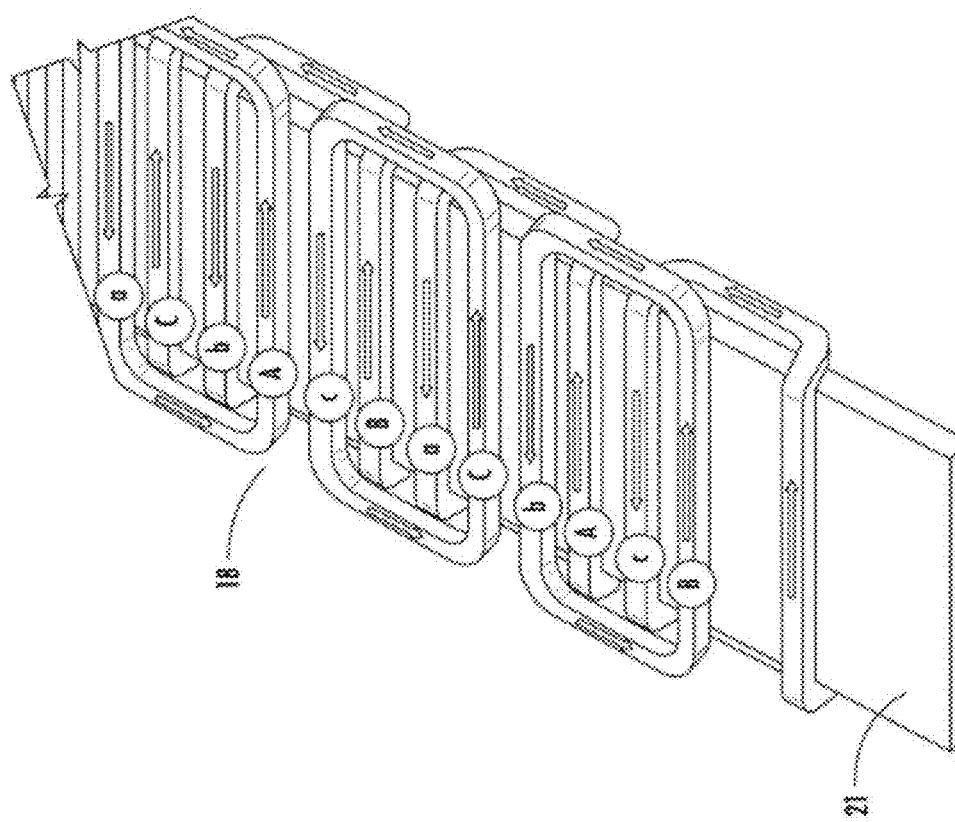
FIG. 4 is a perspective view depicting primary windings on a flat core in an exemplary embodiment.

Primary windings 18 may also be formed on a face of a flat stator core 21 as shown in FIG. 4. In such embodiments, permanent magnets 22 and secondary winding 18 are collocated on a side wall of elevator car 12, facing primary windings 18. The phase pattern of the coils making up primary windings 18 is shown in FIG. 4, and is similar to that in FIG. 3. As shown in FIG. 4, the coils of primary windings 18 (and the secondary windings 24) follow a phase pattern of negative C phase, c, positive A phase, A, negative B phase, b, positive C phase, C, negative A phase, a, and positive B phase, B. The current direction in each coil is also depicted in FIG. 4.

Figure 5:
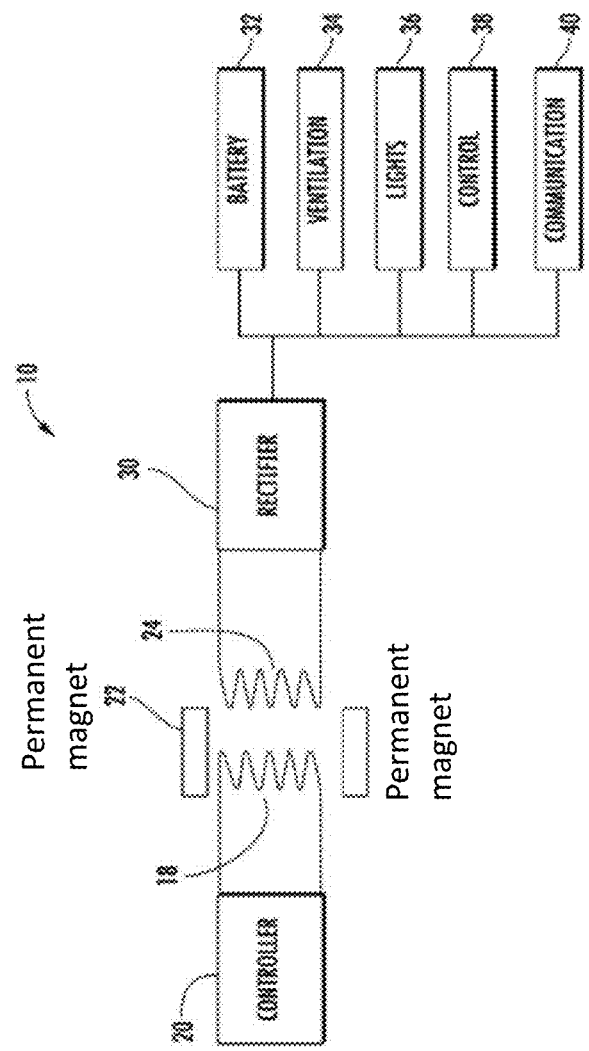
FIG. 5 is a schematic diagram of an elevator system in an exemplary embodiment.

FIG. 5 is a high level schematic diagram of the elevator system 10. Controller 20 provides three-phase drive signals to the primary windings 18. The interaction between primary windings 18 and permanent magnets 22 imparts motion elevator car 12. The permanent magnets 22 and secondary windings 24 mounted to elevator car 12 move with synchronous speed relative to the primary windings 18. The speed depends on the fundamental frequency of the electromagnetic field excited by the primary windings 18. Coils of the secondary windings 24 have the same pole pitch as coils of the primary windings 18. Secondary windings 24 include individual coils having the same longitudinal dimension as individual coils of primary winding 18. There is no electromotive force in the secondary windings 24 induced by the fundamental frequency of the primary electromagnetic field during the movement of the elevator car 12 with synchronous speed (i.e., a speed produced by the fundamental frequency of the electromagnetic field generated by primary winding). Electromotive forces, however, are induced in the secondary windings 24 by the fundamental frequency of the drive signal (e.g., PWM carrier signal) from controller 20.

The secondary windings 24 are connected to a rectifier 30 to convert the AC current to DC current. The output of rectifier 30 is provided to one or more elevator car subsystems, including a battery 32, ventilation unit 34, lighting system 36, control unit 38 and communication unit 40. It is understood that rectifier 30 may provide power to a variety of elevator car subsystems, and the components in FIG. 3 are exemplary. According to further exemplary embodiments, the output of rectifier 30 may be stored locally on the elevator car 12 for use as emergency power.

Embodiments enable wireless energy transfer to a moving elevator car of a self-propelled elevator. This eliminates the need for moving cables or current collectors/sliders for connecting a moving elevator car with power lines distributed along the elevator hoistway. The secondary windings also provide an electromagnetic shielding barrier between primary windings of the linear motor and the interior of the elevator car.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments and that various aspects of the invention, although described in conjunction with one exemplary embodiment may be used or adapted for use with other embodiments even if not expressly stated. Accordingly, the invention is not to be seen as being limited by the foregoing description, but is only limited by the scope of the appended claims.

The invention claimed is:

1. An elevator system comprising:
an elevator car having an elevator car subsystem;
a guide rail to guide the elevator car along a hoistway;
primary windings positioned along the hoistway;
permanent magnets coupled to the elevator car, the primary windings and permanent magnets defining a linear motor for imparting motion to the elevator car in response to a drive signal; and
secondary windings coupled to the elevator car, the secondary windings generating a current to power the elevator car subsystem.

2. The elevator system of claim 1 wherein:
a pitch of coils of the secondary windings matches a pitch of coils of the primary windings.

3. The elevator system of claim 1 wherein:
the secondary windings are positioned on both sides of the primary windings.

4. The elevator system of claim 1 wherein:
the secondary windings face one side of the primary windings.

5. The elevator system of claim 1 wherein:
at least one coil of the secondary windings is collocated with one of the permanent magnets.

6. The elevator system of claim 1 wherein:
the elevator car subsystem includes at least one of a battery, a ventilation unit, a lighting system, a control unit and a communication unit.

7. The elevator system of claim 1 wherein:
the secondary windings generate the current to power the elevator car subsystem in response to a fundamental frequency of the drive signal.

8. The elevator system of claim 7 wherein:
wherein the drive signal is a pulse width modulation signal, the fundamental frequency being a carrier frequency of the pulse width modulation signal.

9. A wireless power supply for an elevator car, the wireless power supply comprising:
primary windings;
permanent magnets for coupling to an elevator car, the primary windings and permanent magnets defining a linear motor for imparting motion to the elevator car in response to a drive signal; and
secondary windings for coupling to the elevator car, the secondary windings generating a current to power an elevator car subsystem.

10. The wireless power supply of claim 9 wherein:
a pitch of coils of the secondary windings matches a pitch of coils of the primary windings.

11. The wireless power supply of claim 9 wherein:
the secondary windings are positioned on both sides of the primary windings.

12. The wireless power supply of claim 9 wherein:
the secondary windings face one side of the primary windings.

13. The wireless power supply of claim 9 wherein:
at least one coil of the secondary windings is collocated with one the permanent magnets.

14. The wireless power supply of claim 9 wherein:
the elevator car subsystem includes at least one of a battery, a ventilation unit, a lighting system, a control unit and a communication unit.

15. The wireless power supply of claim 9 wherein:
the secondary windings generate the current to power the elevator car subsystem in response to a fundamental frequency of the drive signal.

16. The elevator system of claim 15 wherein:
wherein the drive signal is a pulse width modulation signal, the fundamental frequency being a carrier frequency of the pulse width modulation signal.

17. A linear motor system, comprising:
a plurality of permanent magnets, configured to be attached to a movable component;
a plurality of primary windings configured to impart motion to the permanent magnets; and
a plurality of secondary windings configured to be coupled to the movable component, wherein the plurality of secondary windings are configured to passively generate an electrical current when the movable component moves in relation to the plurality of primary windings, the secondary windings configured to provide the current to a subsystem.

18. The linear motor system of claim 17, further comprising a rectifier configured to convert the generated electrical current to DC current.

19. The linear motor system of claim 18, further comprising an energy storage device, configured to be functionally coupled to the movable object and further configured to be charged via the converted DC current.

* * * * *